United States Patent
Nie

(10) Patent No.: US 10,915,203 B2
(45) Date of Patent: Feb. 9, 2021

(54) DISPLAY PANEL

(71) Applicant: WUHAN CHINA STAR OPTOELECTRONICS TECHNOLOGY CO., LTD., Wuhan (CN)

(72) Inventor: Xiaohui Nie, Wuhan (CN)

(*) Notice: Subject to any disclaimer, the term of this patent is extended or adjusted under 35 U.S.C. 154(b) by 0 days.

(21) Appl. No.: 16/612,763

(22) PCT Filed: Aug. 6, 2019

(86) PCT No.: PCT/CN2019/099420
§ 371 (c)(1),
(2) Date: Nov. 12, 2019

(87) PCT Pub. No.: WO2020/258450
PCT Pub. Date: Dec. 30, 2020

(65) Prior Publication Data
US 2020/0409526 A1   Dec. 31, 2020

(30) Foreign Application Priority Data

Jun. 25, 2019   (CN) .......................... 2019 1 0554140

(51) Int. Cl.
*G06F 3/041* (2006.01)
*G06F 3/044* (2006.01)
*G02F 1/1333* (2006.01)

(52) U.S. Cl.
CPC ........ *G06F 3/04164* (2019.05); *G06F 3/0412* (2013.01); *G06F 3/0445* (2019.05); *G02F 1/13338* (2013.01)

(58) Field of Classification Search
CPC ............................ G06F 3/0445; G06F 3/0446
See application file for complete search history.

(56) References Cited

U.S. PATENT DOCUMENTS

| | | | |
|---|---|---|---|
| 2014/0104233 A1 | 4/2014 | Wang et al. | |
| 2015/0042601 A1* | 2/2015 | Lee ..................... | G06F 3/04164 345/174 |
| 2017/0300160 A1* | 10/2017 | Tsai ....................... | G06F 3/0414 |
| 2017/0329442 A1 | 11/2017 | Wang et al. | |
| 2018/0095584 A1* | 4/2018 | Lee ..................... | H01L 27/3213 |
| 2018/0307076 A1 | 10/2018 | Chen et al. | |
| 2019/0333938 A1 | 10/2019 | Wang | |

FOREIGN PATENT DOCUMENTS

| | | |
|---|---|---|
| CN | 104915081 A | 9/2015 |
| CN | 106293298 A | 1/2017 |
| CN | 106933416 A | 7/2017 |
| CN | 206774549 U | 12/2017 |
| CN | 108319397 A | 7/2018 |
| CN | 108511465 A | 9/2018 |

\* cited by examiner

*Primary Examiner* — Kevin M Nguyen

(57) ABSTRACT

The present invention discloses a display panel. The display panel includes a touch electrode area. The touch electrode area includes a first touch circuit layer and a second touch circuit layer corresponding to the first touch circuit layer. Wherein the first touch circuit layer is electrically connected to the second touch circuit layer, and the first touch circuit layer and the second touch circuit layer completely coincide with each other in a direction perpendicular to the display panel.

15 Claims, 2 Drawing Sheets

DISPLAY PANEL

FIELD OF INVENTION

The present invention relates to the field of display panel technologies, and in particular, to a display panel.

BACKGROUND OF INVENTION

In order to realize integration of a liquid crystal display and a touch function, in small and medium size display panels, a common electrode is generally patterned to be used as a common electrode of the liquid crystal display and a sensing electrode of a touch function, and simultaneously drive display and touch functions through time-sharing. According to how well the sensing electrode are embedded in the liquid crystal panel, the touch function can be an on-cell touch panel (TP) technology and an in-cell TP technology. The in-cell TP technology fully embeds the touch function into liquid crystal pixels, so it has the advantages of thin thickness, excellent display effect, and good penetration rate. It is the first choice for the high-end market of the small and medium size display panels. The in-cell TP technology is divided into a mutual capacitive touch technology and a self-capacitive touch technology according to different working principles. The self-capacitive in-cell TP technology divides the sensing electrode into sensor pads by a graphical method, and each of the sensor pads is separately connected to form a touch channel by arranging one or more TP trace. The TP trace is sequentially connected to an integrated circuit (IC) chip at a bottom of the display panel to implement multi-touch. Therefore, an impedance of the TP trace is a key indicator that determines a sensitivity of the touch function. The prior art generally reduces the impedance by widening a trace width of the TP trace. However, an increase in the trace width of the TP trace in the display panel causes a decrease in an aperture ratio, which in turn causes a decrease in a backlight transmittance of the display panel and affects the display quality.

Technical Problem

An embodiment of the present invention provides a display panel, which can reduce a touch impedance, improve a touch sensitivity and accuracy while ensuring a backlight transmittance of the display panel is constant.

Technical Solution

An embodiment of the present invention provides a display panel comprising a touch electrode area and a thin film transistor area, wherein the touch electrode area comprises:

a first touch circuit layer; and a second touch circuit layer corresponding to the first touch circuit layer;

wherein the first touch circuit layer is electrically connected to the second touch circuit layer, and projections of the first touch circuit layer and the second touch circuit layer completely coincide with each other in a direction perpendicular to the display panel; and wherein the thin film transistor area comprises a shading layer disposed in the same layer as the first touch circuit layer.

Further, the first touch circuit layer comprises a plurality of first touch lines, and the second touch circuit layer comprises a plurality of second touch lines disposed corresponding to the first touch lines; and projections of each of the first touch lines and each of the second touch lines corresponding to each of the first touch lines completely coincide with each other in the direction perpendicular to the display panel.

Further, the touch electrode area further comprises a buffer layer disposed between the first touch circuit layer and the second touch circuit layer; and a first via is disposed in the buffer layer, and the first touch circuit layer is electrically connected to the second touch circuit layer through the first via.

Further, the touch electrode area further comprises a gate insulating layer disposed between the buffer layer and the second touch circuit layer; and a second via communicating with the first via is disposed in the gate insulating layer, and the first touch circuit layer is electrically connected to the second touch circuit layer through the first via and the second via.

Further, the touch electrode area further comprises an interlayer insulating layer disposed between the gate insulating layer and the second touch circuit layer; and a third via communicating with the second via is disposed in the interlayer insulating layer, and the first touch circuit layer is electrically connected to the second touch circuit layer through the first via, the second via, and the third via.

Further, apertures of the first via, the second via, and the third via are sequentially decreased.

Further, the thin film transistor area further comprises a thin film transistor layer disposed on the shading layer; and the shading layer corresponds to a position of a thin film transistor channel of the thin film transistor layer.

Further, the display panel further comprises a base substrate; and wherein the first touch circuit layer and the shading layer are disposed on the base substrate.

Further, the display panel further comprises a control chip disposed on a side of the base substrate away from the first touch circuit layer; and wherein the first touch circuit layer and the second touch circuit layer are electrically connected to the control chip.

An embodiment of the present invention further provides a display panel comprising a touch electrode area, wherein the touch electrode area comprises:

a first touch circuit layer; and a second touch circuit layer corresponding to the first touch circuit layer;

wherein the first touch circuit layer is electrically connected to the second touch circuit layer, and projections of the first touch circuit layer and the second touch circuit layer completely coincide with each other in a direction perpendicular to the display panel.

Further, the first touch circuit layer comprises a plurality of first touch lines, and the second touch circuit layer comprises a plurality of second touch lines disposed corresponding to the first touch lines; and projections of each of the first touch lines and each of the second touch lines corresponding to each of the first touch lines completely coincide with each other in the direction perpendicular to the display panel.

Further, the touch electrode area further comprises a buffer layer disposed between the first touch circuit layer and the second touch circuit layer; and a first via is disposed in the buffer layer, and the first touch circuit layer is electrically connected to the second touch circuit layer through the first via.

Further, the touch electrode area further comprises a gate insulating layer disposed between the buffer layer and the second touch circuit layer; and a second via communicating with the first via is disposed in the gate insulating layer, and the first touch circuit layer is electrically connected to the second touch circuit layer through the first via and the second via.

Further, the touch electrode area further comprises an interlayer insulating layer disposed between the gate insulating layer and the second touch circuit layer; and a third via communicating with the second via is disposed in the interlayer insulating layer, and the first touch circuit layer is electrically connected to the second touch circuit layer through the first via, the second via and the third via.

Further, apertures of the first via, the second via, and the third via are sequentially decreased.

Further, the display panel further comprises a base substrate; and wherein the first touch circuit layer is disposed on the base substrate.

Further, the display panel further comprises a control chip disposed on a side of the base substrate away from the first touch circuit layer; and wherein the first touch circuit layer and the second touch circuit layer are electrically connected to the control chip.

BENEFICIAL EFFECT

The beneficial effects of the present invention are: disposing two touch circuit layers electrically connected to each other in a touch electrode area of a display panel, i.e. a first touch circuit layer and a second touch circuit layer, and projections of the first touch circuit layer and the second touch circuit layer completely coincide with each other in a direction perpendicular to the display panel, which ensures that a trace width of a touch circuit in the touch circuit layer is unchanged, thereby ensuring that a backlight transmittance of the display panel remains unchanged, which can reduce a touch impedance, improve a touch sensitivity and accuracy.

DESCRIPTION OF DRAWINGS

In order to more clearly illustrate the embodiments or the technical solutions in the prior art, a brief introduction of the drawings used in the embodiments or the prior art description will be briefly described below. Obviously, the drawings in the following description are only some of the embodiments of the invention, and those skilled in the art can obtain other drawings according to the drawings without any creative work.

DETAILED DESCRIPTION OF PREFERRED EMBODIMENTS

Figure 1:
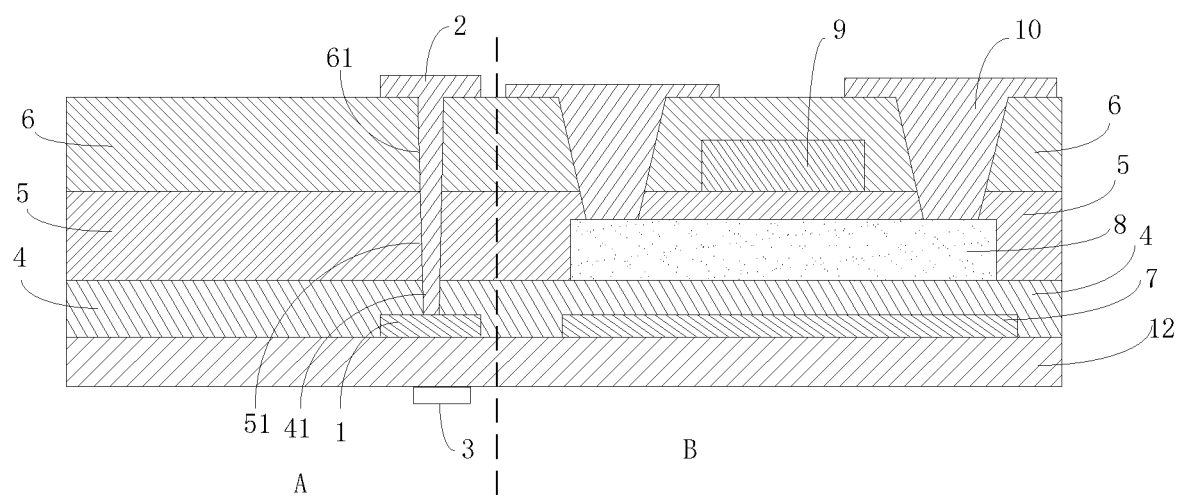
FIG. 1 is a schematic structural view of a display panel according to an embodiment of the present invention.

The preferred embodiments of the present invention are described below with reference to accompanying drawings to illustrate that the present invention can be implemented. These embodiments can fully introduce technical contents of the present invention to those skilled in the art, so that the technical contents of the present invention are more clear and easy to understand. However, the invention may be embodied in many different forms of embodiments, and scopes of the invention are not limited to the embodiments set forth herein.

Terms used in the description of the invention are for the purpose of description. Expressions used in the singular encompasses the plural forms of expression unless the context clearly dictates otherwise. In the description of the present invention, it is to be understood that the terms such as "comprises," "comprising," and "having" are intended to indicate the presence of the features, numbers, steps, acts, or combinations thereof disclosed in the specification. It is not intended to exclude the possibility that one or more other features, numbers, steps, acts or combinations may be added. The same reference numerals in the drawings denote the same parts.

Referring to FIG. 1, which is a schematic structural view of a display panel according to an embodiment of the present invention.

As shown in FIG. 1, the display panel provided in the embodiment comprises a touch electrode area A for disposing a touch electrode and a touch panel (TP) trace thereof. The touch electrode area A comprises two touch circuit layers, that is, a first touch circuit layer 1 and a second touch circuit layer 2. The first touch circuit layer 1 and the second touch circuit layer 2 are disposed corresponding to each other, and the first touch circuit layer 1 is electrically connected to the second touch circuit layer 2 to achieve the purpose of reducing touch impedance.

In addition, projections of the first touch circuit layer 1 and the second touch circuit layer 2 completely coincide with each other in a direction perpendicular to the display panel. That is, the first touch circuit layer 1 and the second touch circuit layer 2 are completely identical in structure, and the positions are completely corresponding, so that the first touch circuit layer 1 is symmetrically disposed with respect to the second touch circuit layer 2 to ensure that a trace width and the number of the touch lines in the direction parallel to the display panel are unchanged, thereby ensuring backlight transmittance of the display panel is unchanged, and touch sensitivity and accuracy are improved.

Figure 2:
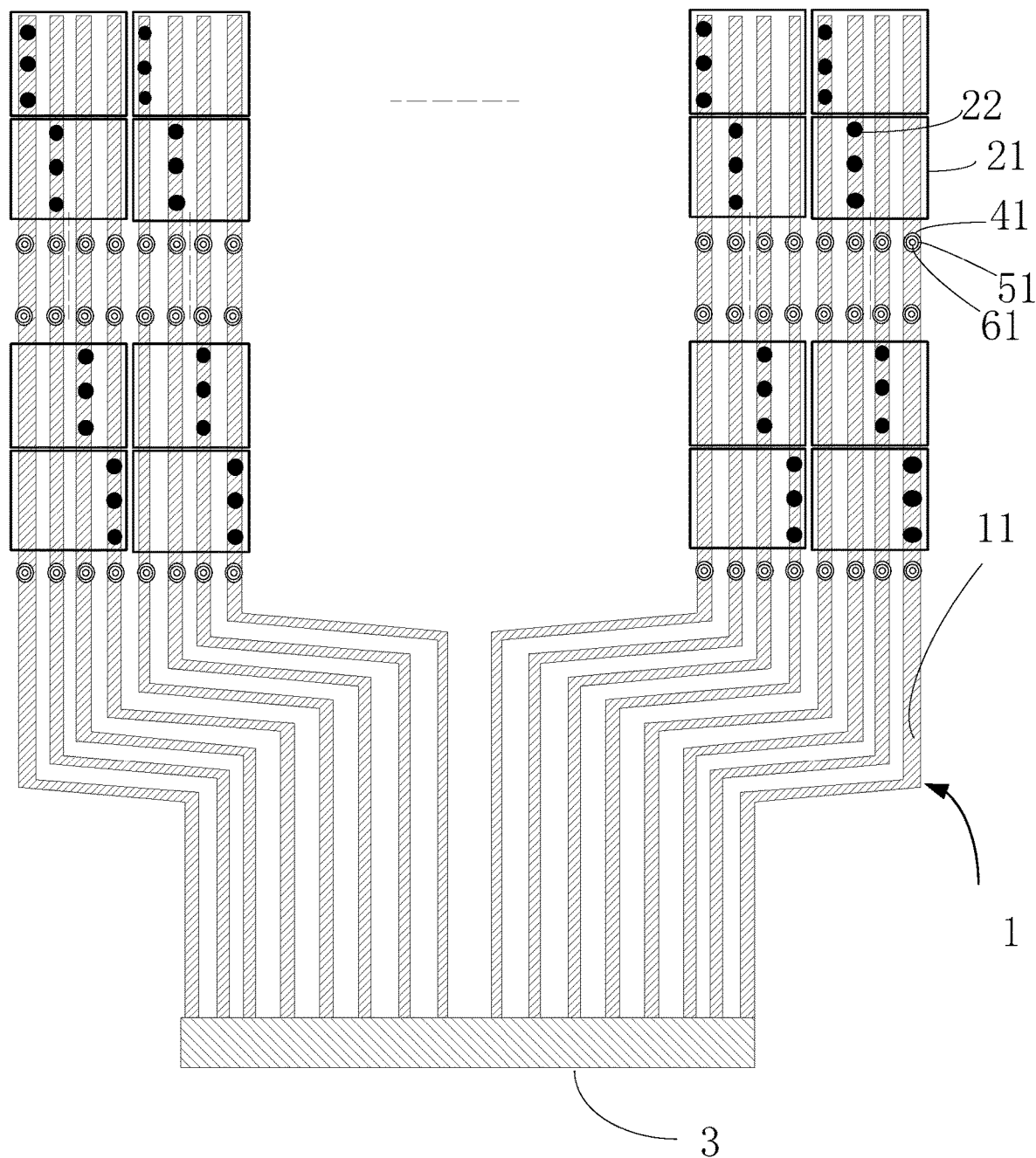
FIG. 2 is a schematic view showing a positional relationship between a first touch circuit, a control chip, vias, and a sensor in a display panel according to an embodiment of the present invention.

Further, as shown in FIG. 2, the first touch circuit layer 1 comprises a plurality of first touch lines 11. The first touch line 11 is a metal trace of the touch electrode. The touch electrode is divided into sensors with a checkerboard arrangement by a graphical method, and each of the sensors is individually connected by one or more metal traces to form a touch channel. The second touch circuit layer 2 has the same structure. That is, the second touch circuit layer 2 comprises a plurality of second touch lines (not shown). The second touch lines are disposed corresponding to the first touch lines, and each of the first touch lines 11 is electrically connected to the corresponding second touch line to reduce the touch impedance.

In addition, projections of each of the first touch lines 11 and each of the second touch lines corresponding to each of the first touch lines 11 completely coincide with each other in the direction perpendicular to the display panel. That is, each of the first touch lines 11 and the corresponding second touch lines are completely identical in structure (for example, the trace width is equal), and the positions are completely corresponding, so that the first touch lines are symmetrically disposed with respect to the second touch lines to ensure that the trace width and the number of the touch lines in the direction parallel to the display panel are unchanged, thereby ensuring the backlight transmittance of the display panel is unchanged, and the touch sensitivity and accuracy are improved.

Further, as shown in FIG. 1, the touch electrode area A further comprises a control integrated circuit (IC) 3. The control IC 3 is disposed on a side of the first touch circuit layer 1 away from the second touch circuit layer 2. Specifically, the control IC 3 is disposed at a bottom of the display panel, and the control IC 3 is electrically connected to the first touch circuit layer 1. That is, the control IC 3 is electrically connected to each of the first touch lines 11 of the first touch circuit layer 1, or the control IC 3 and the second touch circuit layer 2 are electrically connected. That is, the control IC 3 is electrically connected to each of the second touch lines in the second touch circuit layer 2, or the control IC 3 is electrically connected to the first touch circuit layer 1 and the second touch circuit layer 2 at the same time. That is, the control IC 3 is electrically connected to each of the first touch circuit layer 1 and the second touch circuit layer 2.

For example, as shown in FIG. 2, all the first touch lines 11 in the first touch circuit layer 1 are gathered at the control IC 3 at the bottom of the display panel, and each of the first touch lines 11 is electrically connected to the control IC 3.

Further, as shown in FIG. 1, the touch electrode area A further comprises a buffer layer 4 disposed between the first touch circuit layer 1 and the second touch circuit layer 2. A first via 41 is disposed in the buffer layer 4, and the first touch circuit layer 1 is electrically connected to the second touch circuit layer 2 through the first via 41.

In the embodiment, each of the first touch lines 11 and the corresponding second touch lines correspond to a first via 41. Each of the second touch lines extends to the corresponding first via 41 and contacts the corresponding first touch line to realize electrical connection between each second touch line and the corresponding first touch line 11.

Further, as shown in FIG. 1, the touch electrode area A further comprises a gate insulating layer 5 disposed between the buffer layer 4 and the second touch circuit layer 2. A second via 51 communicating with the first via 41 is disposed in the gate insulating layer 5, and the first touch circuit layer 1 is electrically connected to the second touch circuit layer 2 through the first via 41 and the second via 51.

In the embodiment, each of the first touch lines and the corresponding second touch lines correspond to a first via 41 and a second via 51, and each of the first vias 41 is corresponding to and communicates with the corresponding second vias 51. Each of the second touch lines extends to the corresponding first via 41 and the second via 51, and is in contact with the corresponding first touch line to realize electrical connection between each second touch line and the corresponding first touch line.

Further, as shown in FIG. 1, the touch electrode area A further comprises an interlayer insulating layer 6 disposed between the gate insulating layer 5 and the second touch circuit layer 2. A third via 61 communicating with the second via 51 is disposed in the interlayer insulating layer 6, and the first touch circuit layer 1 is electrically connected to the second touch circuit layer 2 through the first via 41, the second via 51, and the third via 61.

In the embodiment, each of the first touch lines and the corresponding second touch line correspond to a first via 41, a second via 51 and a third via 61, and each of the first vias 41 is corresponding to positions of the corresponding second via 51 and the third via 61, and communicates with the corresponding second via 51 and the third via 61. Each second touch line extends to the corresponding first via 41, second via 51 and third via 61, and contacts the corresponding first touch line to realize electrical connection between each second touch line and the corresponding first touch line.

Apertures of the first via 41, the second via 51, and the third via 61 may be the same. The apertures of the first via 41, the second via 51, and the third via 61 may be sequentially decreased. That is, the aperture of the first via 41 is the largest, and the aperture of the third via 61 is the smallest. As shown in FIG. 2, an orthographic projection of the third via 61 on the first touch circuit layer 1 is disposed in an orthographic projection of the second via 51 on the first touch circuit layer 1. The orthographic projection of the second via 51 on the first touch circuit layer 1 is disposed in an orthographic projection of the first via 41 on the first touch circuit layer 1 so as to quickly locate a position of the first via 41 and communicate with the first via 41 when the second via 51 is formed, and then to quickly locate a position of the second via 51 and communicate with the second via 51 when the third via 61 is formed. In addition, the display panel further comprises a sensor 21, and an electrical connection hole 22 is correspondingly disposed in a film layer between the sensor 21 and the first touch circuit layer 1 or the second touch circuit layer 2, so that the sensor 21 is electrically connected to the first touch circuit layer 1 or the second touch circuit layer 2 through the electrical connection hole 22. As shown in FIG. 2, an orthographic projection of the electrical connection hole 22 on the first touch circuit layer 1 is disposed in an orthographic projection of the sensor 21 on the first touch circuit layer 1.

Further, as shown in FIG. 1, the display panel further comprises a thin film transistor area B. The thin film transistor area B comprises a shading layer 7 disposed in the same layer as the first touch circuit layer 1. Wherein, material of the shading layer 7 is metal.

Moreover, the thin film transistor area B further comprises a thin film transistor layer disposed on the shading layer 7. The shading layer corresponds to a position of a thin film transistor channel of the thin film transistor layer.

Specifically, the thin film transistor layer comprises a buffer layer 4, an active layer 8, a gate insulating layer 5, a gate electrode 9, an interlayer insulating layer 6, and source-drain electrodes 10, which are sequentially disposed on the shading layer 7.

The buffer layer 4 is disposed on the shading layer 7, and material of the buffer layer 4 may be SiNx or SiOx. The active layer 8 is disposed on the buffer layer 4, and material of the active layer 8 may be Poly-Si. The gate insulating layer 5 is disposed on the buffer layer 4 and the active layer 8, and material of the gate insulating layer 5 may be SiOx. The gate 9 is disposed on the gate insulating layer 5. The interlayer insulating layer 6 is disposed on the gate insulating layer 5 and the gate electrode 9, and material of the interlayer insulating layer 6 may be SiNx or SiOx. The source-drain electrodes 10 are both disposed on the interlayer insulating layer 6 and electrically connected to the active layer 8.

The buffer layer 4 in the thin film transistor area B is disposed in the same layer as the buffer layer 4 in the touch electrode area A, and is an integrated structure. The gate insulating layer 5 in the thin film transistor area B is disposed in the same layer as the gate insulating layer 5 in the touch electrode area A, and is an integrated structure. The interlayer insulating layer 6 in the thin film transistor area B is disposed in the same layer as the interlayer insulating layer 6 in the touch electrode area A, and is an integrated structure.

Since a forbidden band width of the active layer 8 is narrow, photocurrent is easily generated under lighting conditions, resulting in deterioration of electrical characteristics of the thin film transistor. Therefore, metal is generally used. That is, the shading layer 7 blocks the thin film transistor channel of the thin film transistor to reduce an influence of light on the thin film transistor. The shading layer 7 does not make any electrical connection, and is only used as a channel shading.

Moreover, the display panel further comprises a base substrate 12, and the first touch circuit layer 1 and the shading layer 7 are disposed on the base substrate 12.

At the time of manufacturing, a metal layer is first formed on the base substrate 12 by a physical vapor deposition process, and then a pattern is formed on the metal layer by an exposure etching process. The pattern in the touch electrode area A is the first touch circuit layer 1, and the pattern in the thin film transistor area B is the shading layer 7. Further, a buffer layer 4 is formed on the base substrate 12, the first touch circuit layer 1, and the shading layer 7 by the exposure etching process. Then, opening a first via 41 at a position corresponding to the first touch circuit layer 1 in the buffer layer 4, thereby forming an active layer 8 on the buffer layer 4. The gate insulating layer 5 and the gate layer are respectively formed by a chemical vapor deposition and the physical vapor deposition. A second via 42 is formed in the gate insulating layer 5 at a position corresponding to the first via 41 by the exposure etching process, and the gate layer is formed into the gate electrode 9. Further, an interlayer insulating layer 6 is formed on the gate insulating layer 5 and the gate electrode 9 by the chemical vapor deposition, and a third via 61 is formed in the interlayer insulating layer 6 at a position corresponding to the second via 51 by the exposure etching process. Finally, the second touch circuit layer 2 and the source-drain electrodes 10 are formed on the interlayer insulating layer 6 by the physical vapor deposition and the exposure etching process, and the second touch circuit layer 2 passes through the third vias 61 and the second vias 51. The first via 41 is electrically connected to the first touch circuit layer 1, and the source-drain electrodes 10 are electrically connected to the active layer 8.

As can be seen from the above, the display panel provided in the embodiment can provide two touch circuit layers electrically connected to each other in the touch electrode area of the display panel, i.e. the first touch circuit layer and the second touch circuit layer, and the projections of the first touch circuit layer and the second touch circuit layer completely coincide with each other in the direction perpendicular to the display panel, which ensures that the trace width of the touch circuit in the touch circuit layer is unchanged, thereby ensuring that the backlight transmittance of the display panel remains unchanged, which can reduce the touch impedance and improve the touch sensitivity and accuracy.

In the above, various other corresponding changes and modifications can be made according to the technical solutions and technical ideas of the present invention to those skilled in the art, and all such changes and modifications are within the scope of the claims of the present invention.

What is claimed is:

1. A display panel comprising a touch electrode area and a thin film transistor area, wherein the touch electrode area comprises:
   a first touch circuit layer; and
   a second touch circuit layer corresponding to the first touch circuit layer;
   wherein the first touch circuit layer is electrically connected to the second touch circuit layer;
   wherein the thin film transistor area comprises a shading layer disposed in a same layer as the first touch circuit layer; and
   wherein the touch electrode area further comprises a buffer layer disposed between the first touch circuit layer and the second touch circuit layer, a first via is disposed in the buffer layer, and the first touch circuit layer is electrically connected to the second touch circuit layer through the first via.

2. The display panel as claimed in claim 1, wherein the first touch circuit layer comprises a plurality of first touch lines, and the second touch circuit layer comprises a plurality of second touch lines disposed corresponding to the first touch lines.

3. The display panel as claimed in claim 1, wherein the touch electrode area further comprises a gate insulating layer disposed between the buffer layer and the second touch circuit layer; and
   a second via communicating with the first via is disposed in the gate insulating layer, and the first touch circuit layer is electrically connected to the second touch circuit layer through the first via and the second via.

4. The display panel as claimed in claim 3, wherein the touch electrode area further comprises an interlayer insulating layer disposed between the gate insulating layer and the second touch circuit layer; and
   a third via communicating with the second via is disposed in the interlayer insulating layer, and the first touch circuit layer is electrically connected to the second touch circuit layer through the first via, the second via, and the third via.

5. The display panel as claimed in claim 4, wherein apertures of the first via, the second via, and the third via are sequentially decreased.

6. The display panel as claimed in claim 5, further comprising a base substrate; and
   wherein the first touch circuit layer and the shading layer are disposed on the base substrate.

7. The display panel as claimed in claim 6, further comprising a control chip disposed on a side of the base substrate away from the first touch circuit layer; and
   wherein the first touch circuit layer and the second touch circuit layer are electrically connected to the control chip.

8. The display panel as claimed in claim 1, wherein the thin film transistor area further comprises a thin film transistor layer disposed on the shading layer; and
   the shading layer corresponds to a position of a thin film transistor channel of the thin film transistor layer.

9. A display panel comprising a touch electrode area, wherein the touch electrode area comprises:
   a first touch circuit layer; and
   a second touch circuit layer corresponding to the first touch circuit layer;
   wherein the first touch circuit layer is electrically connected to the second touch circuit layer; and
   wherein the touch electrode area further comprises a buffer layer disposed between the first touch circuit layer and the second touch circuit layer, a first via is disposed in the buffer layer, and the first touch circuit layer is electrically connected to the second touch circuit layer through the first via.

10. The display panel as claimed in claim 9, wherein the first touch circuit layer comprises a plurality of first touch lines, and the second touch circuit layer comprises a plurality of second touch lines disposed corresponding to the first touch lines.

11. The display panel as claimed in claim 9, wherein the touch electrode area further comprises a gate insulating layer disposed between the buffer layer and the second touch circuit layer; and a second via communicating with the first via is disposed in the gate insulating layer, and the first touch circuit layer is electrically connected to the second touch circuit layer through the first via and the second via.

12. The display panel as claimed in claim 11, wherein the touch electrode area further comprises an interlayer insulating layer disposed between the gate insulating layer and the second touch circuit layer; and a third via communicating with the second via is disposed in the interlayer insulating layer, and the first touch circuit layer is electrically connected to the second touch circuit layer through the first via, the second via and the third via.

13. The display panel as claimed in claim 12, wherein apertures of the first via, the second via, and the third via are sequentially decreased.

14. The display panel as claimed in claim 9, further comprising a base substrate; and wherein the first touch circuit layer is disposed on the base substrate.

15. The display panel as claimed in claim 14, further comprising a control chip disposed on a side of the base substrate away from the first touch circuit layer; and wherein the first touch circuit layer and the second touch circuit layer are electrically connected to the control chip.

* * * * *